Dec. 21, 1965   E. LESAVOY   3,224,011
COLLAR INCLUDING GARMENTS
Original Filed Sept. 12, 1960   5 Sheets-Sheet 1
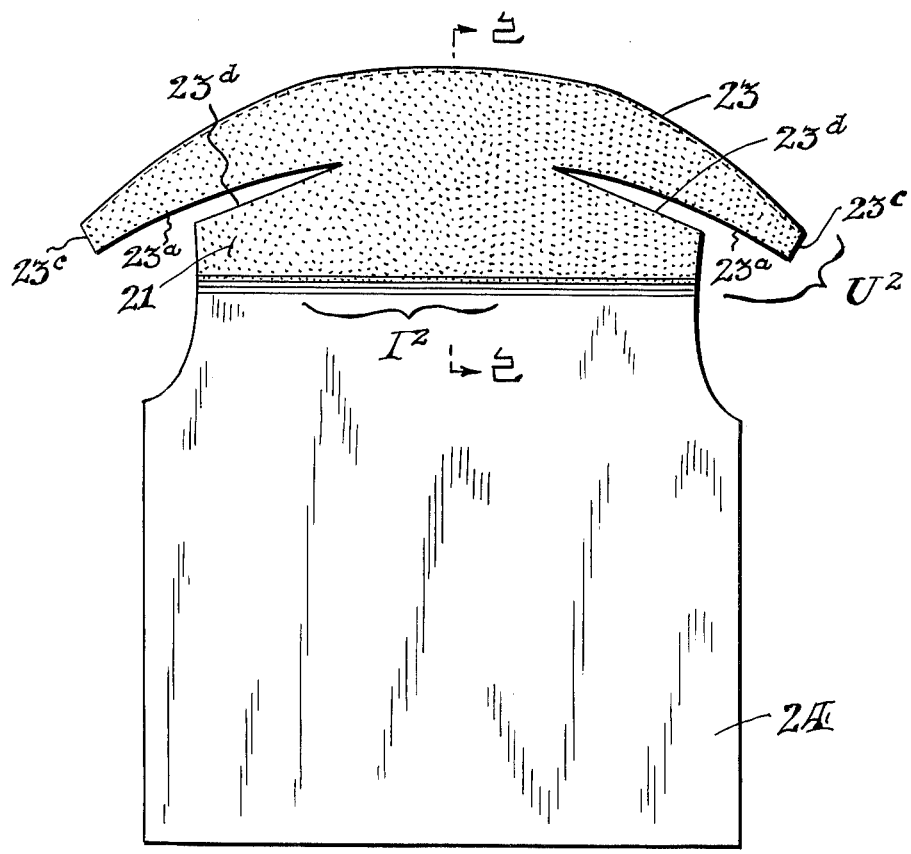
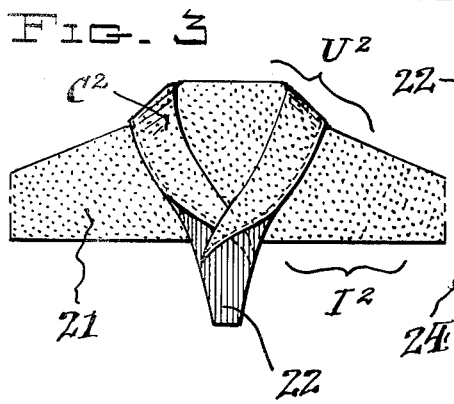
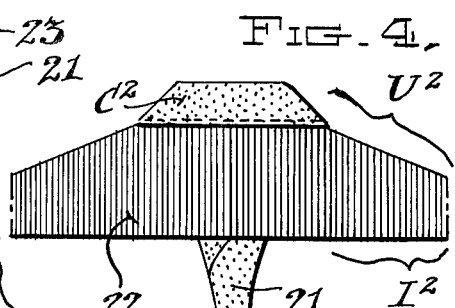
INVENTOR:
Ely Lesavoy,
BY
Alfred E. Ischinger
ATTORNEY.

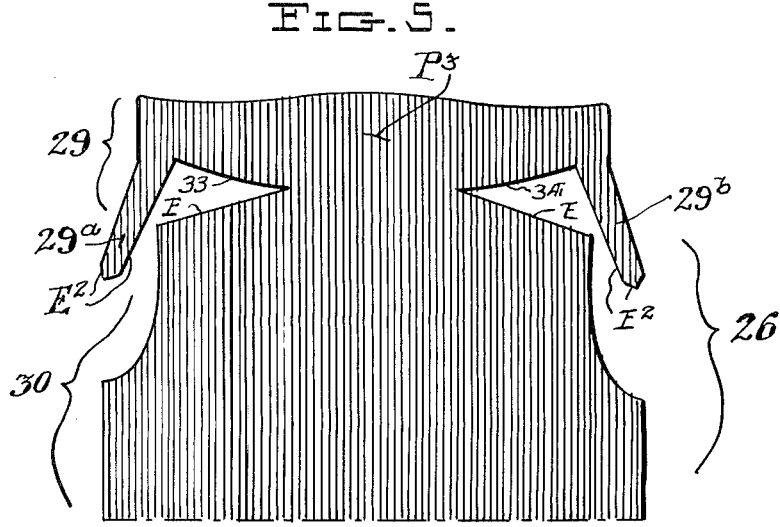
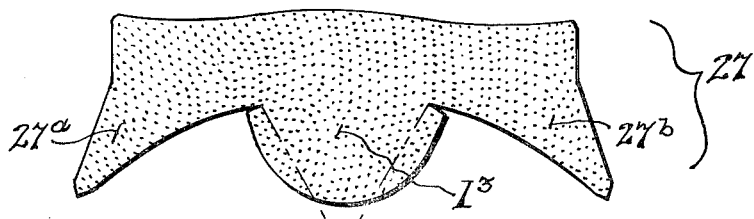
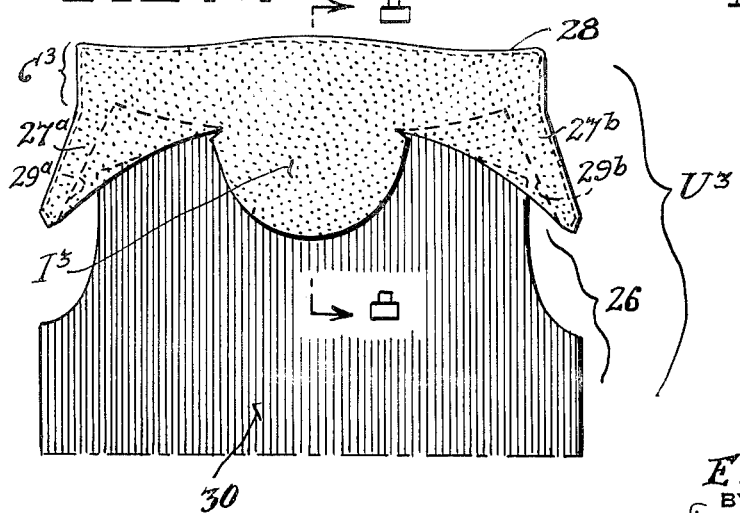
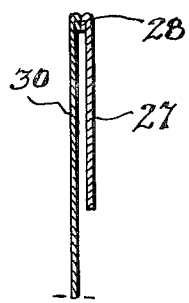
INVENTOR:
Ely Lesavoy,
BY
Alfred E. Ischinger
ATTORNEY

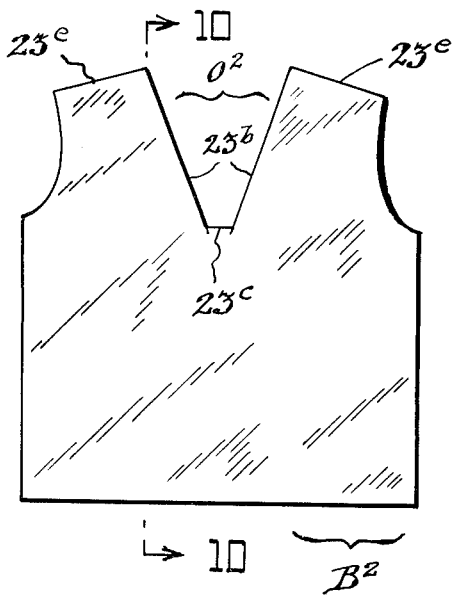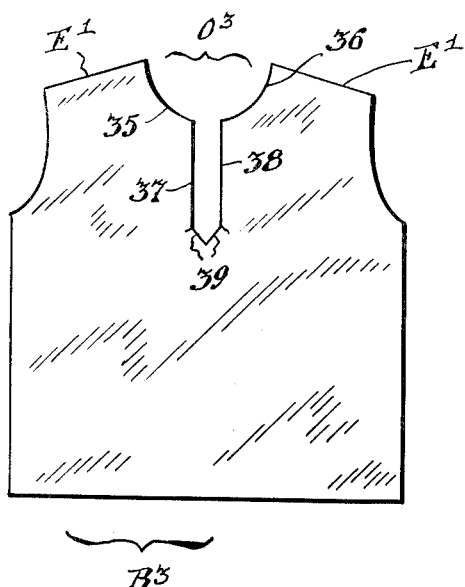

Dec. 21, 1965 E. LESAVOY 3,224,011
COLLAR INCLUDING GARMENTS
Original Filed Sept. 12, 1960 5 Sheets-Sheet 5

INVENTOR:
*Ely Lesavoy,*
BY
*Alfred E. Aschinger*
ATTORNEY.

United States Patent Office 3,224,011
Patented Dec. 21, 1965

3,224,011
COLLAR INCLUDING GARMENTS
Ely Lesavoy, 621 N. 30th St., Allentown, Pa.
Original application Sept. 12, 1960, Ser. No. 55,431, now Patent No. 3,107,357, dated Oct. 22, 1963. Divided and this application Mar. 18, 1963, Ser. No. 266,473
2 Claims. (Cl. 2—116)

This is a divisional application that is directed to a certain part of the subject matter disclosed in my co-pending application Serial Number 55,431, filed September 12, 1960, and now Patent No. 3,107,357.

This invention relates, in general, to collar including garments, or collar including articles of wearing apparel for men, women, children and infants, such for example, as shirts and the like; and more particularly concerns unique garments of this type, as well as unique integral combination units which comprise a collar and a special garment insert member arranged to dependently extend from the rear of the collar portion that is adapted to be positioned adjacent to the nape of the neck of the garment wearer.

Collar including garments, or collar including articles of wearing apparel, such as shirts and the like, have heretofore been provided in a great variety of different types, styles and embodiments. During my continuous activities in the manufacture and sale of such garments for the past thirty years, many changes and improvements have been made in these garments which have progressively enhanced their style, design appearance, lasting quality, wearing comfort, etc. Nevertheless, in all such garments the juncture area and arrangement at the location where the rear portion of the collar is joined with the garment body, has remained substantially the same in general construction, function and appearance. Modern collar including garment manufacturing and commercialization methods and practices, established to best satisfy the prevailing desires and attitudes of the present day purchasers of such garments, has resulted in a situation involving manufacturing and exploitation procedures, demands, requirements and conditions in accordance with which the continuous lack of improvements in the said juncture area and arrangement has brought about an ever increasing realization and awareness in the trade that this garment item has become more or less unsatisfactory, old-fashioned, or obsolete. In view of this, there has existed a long felt need in this field for a practical and effective solution to the problem of overcoming the detrimental aspects and phases in the trade resulting from the provision of modern collar including garments with the said same old-fashioned juncture area and arrangement.

One object of my invention is to provide novel collar including garments, or collar including articles of wearing apparel, such as shirts and the like, which in a practical and effective manner, solve the said problem and overcome the indicated and other detrimental aspects and phases of the prior art practice of procedure here involved.

Another object is to provide such collar including garments having certain structural and functional features of advantage over the similar garments of the prior art.

Another object is to provide such a garment in which an integrally formed collar including garment insert member may be provided in an unlimited variety of shapes and sizes designed to impart to the garment various new, modernistic, structural, functional and appearance features of advantage.

It is also an object to provide such a garment insert structure in which the said garment insert member may extend with the collar, lengthwise of the garment, either to the bottom edge of the garment, or to any desired intermediate point of termination thereof.

An additional object is to provide such a garment insert structure comprising a two-ply collar having a rear portion adapted to be positioned adjacent to the nape of the neck of the garment wearer and a special garment insert member that is integrally formed with one ply, or the other ply, or both plies of said rear collar portion and arranged in dependently extending relation therewith to any selected point of termination as indicated in the preceding paragraph.

With these and other objects in view which will become more readily apparent from the following detailed description of the various practical and illustrative embodiments of the improvements shown in the accompanying drawings, my invention comprises the novel collar including garments or articles of wearing apparel, insert units, elements, features of construction and arrangement of parts in cooperative relationship, as more particularly indicated and defined by the hereto appended claims.

The present divisional application is directed to the form of my invention disclosed by FIGURES 12, 13, 14, 15, 16, 17, 18, 19, 24, 29, 30, 31 and 32 of the drawings of my said Patent Number 3,107,357, which figures are shown in the accompanying drawings and in which:

FIG. 1 is a front elevational view of a form of garment insert unit in accordance with my invention, the said unit being indicated by the stippled area of FIG. 1 and shown attached to a certain rear body section of a garment or shirt.

FIG. 2 is a vertical sectional view, taken substantially as indicated by the arrows 2—2 in FIG. 1.

FIGS. 3 and 4 are, respectively, front and rear elevational views of the unit shown in FIG. 1, as it appears when the upper part thereof is folded to form a shawl type collar in the manner of its inclusion in a garment or shirt.

FIG. 5 is a front elevational view of the upper rear section of integral garment insert unit in accordance with my invention, the lower portion of which section extends to the bottom edge of the garment or shirt body, but has been omitted for simplification of illustration.

FIG. 6 is a front elevational view of the upper front section of the unit referred to in the preceding paragraph, which front section is adapted to be combined in aligned overlying relationship with the upper rear section of the unit as shown in FIG. 5.

FIG. 7 is a composite elevational view of the parts shown in FIGS. 5 and 6, when joined, or seamed together, in proper overlying relationship with each other.

FIG. 8 is a vertical sectional view, taken substantially as indicated by the arrows 8—8 on FIG. 7.

FIG. 9 is a front elevational view of the front section of a garment or shirt body that is adapted to be combined with the insert unit arrangement of FIGS. 1–4.

FIG. 10 is an elevational sectional view, taken substantially as indicated by the arrows 10—10 in FIG. 9.

FIG. 11 is a front elevational view of the front section of a garment or shirt body, which is adapted to be combined with the insert unit arrangement of FIGS. 5–8.

Figure 12:
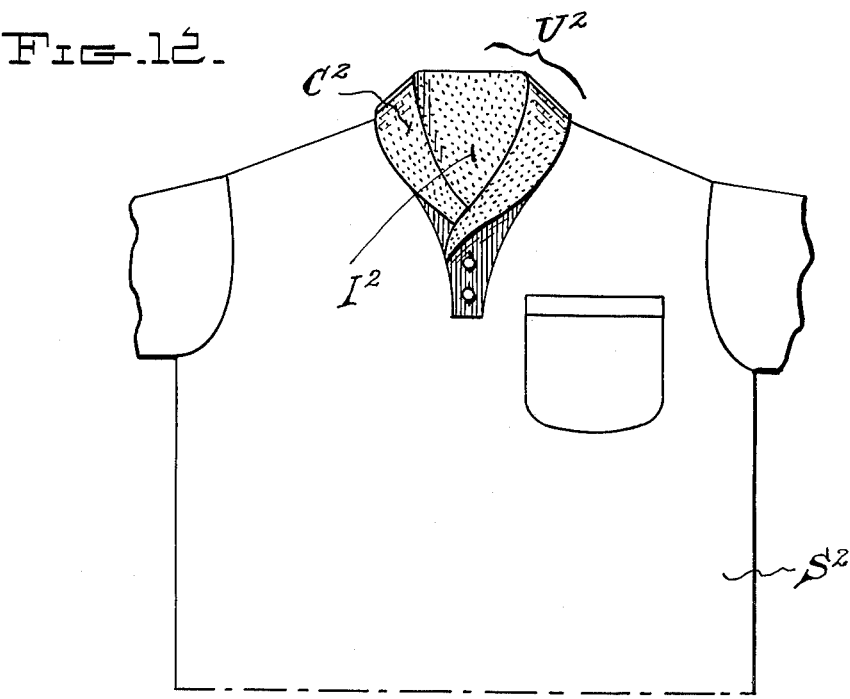
Figure 13:
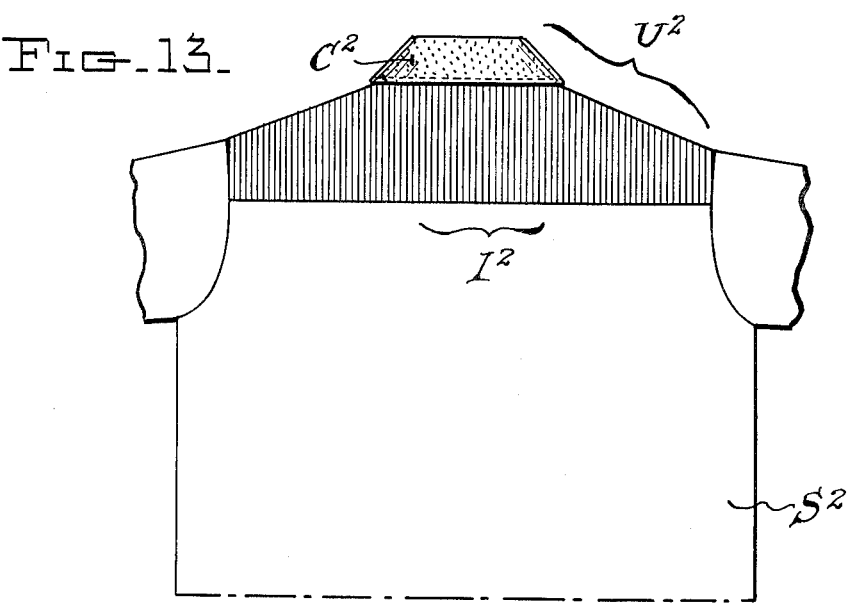

FIGS. 12 and 13 are, respectively, front and rear elevational views of a completed garment or shirt in accordance with my invention and more particularly disclose the part thereof having embodied therein the insert unit of FIGS. 1–4, and FIGS. 14 and 15 are, respectively, front and rear elevational views of a completed garment or shirt in accordance with my invention and more particularly disclose the part thereof having embodied therein the insert unit of FIGS. 5–8.

It will facilitate an understanding of my invention to first briefly consider some of the more important aspects and phases thereof so that these may be kept in mind when subsequently reading the detailed description of the novel, practical and illustrative embodiments of my improvements shown in the accompanying drawings.

Accordingly, it is noted that my invention comprehends the provision of two new garment articles, or items, that involve the same inventive concept and are consequently coextensive or co-related with each other, namely, (1) novel collar including garments for men, women, children and infants, such as shirts and the like, and (2) novel integral garment insert units which enable the provision of such articles of wearing apparel.

As previously indicated, in modern collar including garments, the juncture area and arrangement at the location where the rear portion of the collar is joined with the garment body, has remained unimproved for many years and is today the same in general construction, function and appearance as it was before such garments were provided with the more or less extensive modernization features now embodied therein. The said juncture area and arrangement usually comprises a seam connection between the lower rear edge portion of a separate collar unit and an adjacent upper edge portion of the rear section of a separate garment body member. This seam connection is usually effected by an overlock stitch formation, or some other standard or conventional stitch formation. Such a seam connection or stitch formation, in conjunction with the thickness or bulkiness of the various fabric pieces involved, produces a horizontal ridge-like or rib-like area that protrudes inwardly beyond the adjacent surface of the fabric members joined thereby and consequently results in a rough, irritating, uncomfortable, or otherwise undesirable contact condition with the skin at the area in the vicinity of, or below, the nape of the neck of the garment wearer. Furthermore, the said juncture area and arrangement does not lend itself to more than a very limited degree of variation in the construction, function or appearance of the garment at this location.

In accordance with my invention, the said juncture area is provided with an integral and, therefore, smooth, continuous skin contact surface and is otherwise endowed with qualities and characteristics which enable the embodiment, at the said juncture area in modern collar including garments, of a substantially limitless variety of novel structural, functional and appearance features of advantage. This will become apparent from the practical exemplification of my improvements shown in the drawings and the detailed description thereof hereinafter set forth. In connection with the reading of said description it will facilitate recognizing the said features of advantage of my invention by referring to the listing of the more important such features, which follows:

The said juncture area and arrangement of my invention, in comparison with that of the prior art is:

(1) Structurally stronger.

(2) Presents a smooth uninterrupted skin contact surface at the nape of the neck of the garment wearer that provides better wearing comfort and adds a therapeutic advantage.

(3) Provides a uniform finish area.

(4) Lends itself to a more uniform and precise manufacturing method and procedure.

(5) Requires less skilled labor in its production.

(6) Eliminates certain operations heretofore required.

(7) Opens the field to a new, improved and substantially limitless variety of collar including garment structures and styles.

(8) Enables the use of woven and knitted textile materials made on substantially any type machine and the use of such materials in pattern or texture formations arranged vertically, horizontally, cut on the bias, arranged in interlocking fashion or otherwise.

(9) Makes possible new and attractive appearance combinations between the collar and adjacent garment areas.

(10) Enables greater economy in labor and material.

(11) Better serves as a garment reinforcement at its place of location.

(12) Enables style modernization at its place of location in line with the style trend and modernization of the other parts of the garment.

(13) Supplies a long felt need for improvement and perfection at its location of embodiment in garments which include a collar.

(14) Provides a better and more comfortable fit of the garment at its place of location.

(15) Since the material of which the collar, or a certain portion thereof is made, is the same as that of which the garment insert member is made, as established by their integral connection at the rear of the collar, the garment insert member in texture, pattern, color etc., can be made to correspond with the collar, or with a certain portion thereof.

To indicate the general scope of the structural, functional and appearance versatility of my improvements, four different practical and exemplary embodiments thereof are shown and described in my said Patent Number 3,107,357, the present divisional application being specifically directed to embodiments Nos. 3 and 4 thereof.

In this connection, it will be understood by those skilled in this art that the exemplary embodiments herein disclosed are more or less suggestive of many more similar embodiments which can be provided in accordance with my invention, to supply the present and future collar including garment manufacturing trade with the features of my invention to any extent desired in accordance with the prevailing and future style and other trends.

EMBODIMENT NO. 3

Embodiment No. 3 of my invention is illustrated in the drawings by FIGS. 1 to 4 inclusive and FIGS. 9, 10, 12 and 13.

In these illustrations, FIGS. 1–4, more particularly show the various component parts of another novel integral insert unit for collar including garments and their combined relationship. In this instance, the said unit is generally identified by the reference character $U^2$.

The unit $U^2$ comprises an inside fabric piece 21 and an outside fabric piece 22, which pieces in shape and size are alike and are joined along their upper edges by a seam or stitches 23. If desired, a lining or reinforcing fabric piece such as the fabric piece R of embodiment No. 1 of my invention (shown in said Patent Number 3,107,357), can be included between the pieces 21 and 22.

It will be noted that the pieces 21 and 22, when combined, form the unit $U^2$ as defined by the stippled area of FIG. 1 and that this unit $U^2$ includes an upper substantially arcuate shaped section that is centrally and integrally combined with a lower garment insert section forming part $I^2$, which latter extends laterally or outwardly in both directions to the arm hole cutout edges of a fabric piece 24 that is shaped and otherwise adapted to form the rear part of a garment, or men's shirt body. The lower edge of the unit $U^2$ is joined by a seam or stitches 25 with the upper edge of the fabric piece 24, as indicated in FIG. 2.

When the upper arcuate shaped section of the unit $U^2$ as shown in FIG. 1 is first doubled outwardly and the free ends thereof are then brought forward into overlapping relationship with each other, as shown in FIG. 3, the said upper section of the unit $U^2$ becomes a shawl-type collar formation $C^2$ which, from the front and rear, has the appearance indicated by FIGS. 3 and 4.

The fabric pieces 21 and 22 can be made of textile materials of the same type as the parts of the previously described unit U, disclosed in my said Patent Number 3,107,357.

The combined unit U² and rear garment part forming fabric part 24, as shown in FIG. 1, is adapted to be joined in accordance with the usual prior art practice and procedure with a garment or shirt body front forming fabric piece B². The latter is substantially shaped as shown in FIG. 9 and provided with a cut-out section 0² of proper shape and size so that the corresponding free edges 23ª of the shawl-type collar formation of the unit U² and the edges 23ᵇ defining the cut-out section 0² can be seamed or stitched together in well-known manner and substantially as explained when describing the form of my invention disclosed in my said Patent Number 3,107,357 and involving the unit U thereof. The corresponding bottom edges 23ᶜ of the shawl-type collar formation are joined with the bottom edge 23ᵉ of the shirt body B². The side edges of the rear shirt body forming fabric piece 24 having the unit U² attached thereto as shown in FIG. 1, are then joined by seams or stitches with the corresponding side edges of the front shirt body forming fabric piece B². Likewise, the respective shoulder edges 23ᵈ of the unit U² are seamed or stitched to the corresponding shoulder edges 23 of the front shirt body forming fabric piece B². The various parts so combined or joined are otherwise completed, all in accordance with the prior art shirt manufacturing procedure, to effect a completed garment, or shirt, for men, which from the front and rear has the appearance substantially as illustrated by FIGS. 12 and 13.

EMBODIMENT NO. 4

Figure 14:
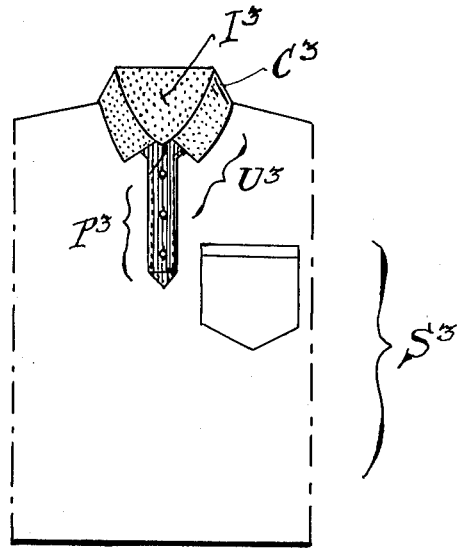
Figure 15:
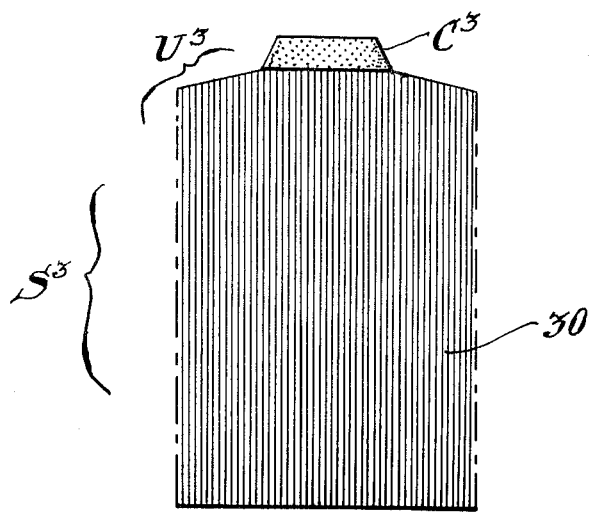

Embodiment No. 4 of my invention is illustrated by FIGS. 5 to 8 inclusive and FIGS. 11, 14 and 15.

In these illustrations, FIGS. 5–8 more particularly disclose the various component parts of a further novel integral insert unit for collar including garments and indicate their particular relationship when combined. In this instance, the said unit is identified by the reference character U³.

The unit U³ comprises an outside fabric piece 26 and an inside fabric piece 27, which pieces, after being combined in the superimposed relationship shown in FIG. 7 are joined along their upper edges and along the perpendicular side edge portions thereof by a seam or stitches 28. Here again, if it is desired to include an intermediate lining fabric between the fabric pieces 26 and 27, this can be done substantially in the same manner as the lining R of embodiment No. 1 of my invention disclosed in my said Patent Number 3,107,357.

It will be noted from FIG. 5 that the outside fabric piece 26 includes an upper section 29 of a certain configuration and that said section 29 is centrally integrally combined with a lower section 30 that forms the entire rear body part of a garment or shirt for men. The upper section 29 of the outer fabric piece 26 is provided with two similar integral placket forming extensions 29ª and 29ᵇ. The inner fabric piece 27 is also provided with two similar integral placket extensions 27ª and 27ᵇ. When inner fabric piece 27 is combined in superimposed relation with the outer fabric piece 26, as shown in FIG. 7, the unit U³ so formed includes a two-ply collar forming part C³ and two placket members formed by the extensions 27ª, 29ª, 27ᵇ and 29ᵇ. The lower section 30 of the rear fabric piece 26 is adapted to form the entire rear body section of a garment or shirt for men, arranged to extend from its point of integral connection with the rear central portion P³ of the shirt collar to the bottom edge of the shirt.

The inside fabric piece 27 which corresponds with the central portion P³ of the outside fabric piece 26 is provided with an integral shield-like member I³ that dependently extends downwardly from the said central portion thereof. The said member I³ is shown as being of a semi-circular configuration. However, if desired, the member I³ can be otherwise shaped and, for example, can be made triangular in shape, as indicated by the dot-and-dash lines 32 in FIG. 6. The member I³ may be arranged in detached relation with the outside fabric piece 26 as shown in FIG. 8, or if desired, the lower curved edge portion of the member I³ can be attached to the outside fabric piece 26 by a seam or sitches, or otherwise.

The unit U³, when in flat condition, appears as shown in FIG. 7. Such a unit is adapted to be combined with the front garment or shirt body forming section B³, shown in FIG. 11, which section B³ is provided with a cut-out section 0³.

The upper end of the unit U³, as shown in FIG. 7, is adapted to be folded, first outwardly so as to form the two-ply collar formation C³ as shown in FIGS. 14 and 15. The outer free ends of this collar formation are then brought together forwardly, to effect a circular collar having a placket arrangement extending downwardly therefrom as indicated at P³ in FIG. 14. The unit U³ is shown in FIG. 14 as it appears when completed and embodied in a finished garment, or a shirt for men. FIG. 15 shows the shirt S³ as it appears when seen from the rear.

As previously explained in connection with the description of the other embodiments of my invention, the unit U³, as shown in FIG. 7, is combined with the shirt front forming fabric piece B³ of FIG. 11, in accordance with the usual and well-known prior art shirt manufacturing practice and procedure. That is to say, the side edges of the shirt front body forming fabric piece B³ are joined by seams with the corresponding side edges of the shirt rear body forming section 30 of the fabric piece 26 of the unit U³. The shoulder edges E of the fabric section 30 are seamed to the corresponding shoulder edges E¹ of the front shirt body member B³. The edges 33 and 34 of the outer fabric piece 26 are then combined by seams or stitches with the edges 35 and 36 of the cut-out portion 0³ of the fabric piece B³. Likewise, the inner and bottom edges E² of the placket extensions 29ª and 29ᵇ are joined by seams or stitches with the side edges 37 and 38 and the bottom edge 39 of the cut-out portion 0³ of the shirt front body fabric B³. Buttons and buttonholes are also provided in usual manner in the completed placket forming arrangement designated P³ in FIG. 14 at a time and in connection with said garment or shirt manufacturing procedure considered best for carrying out this operation.

Concerning the four different embodiments of my invention, all of which are disclosed in my said Patent Number 3,107,357, it is to be particularly noted that embodiment No. 1 illustrates a garment, or shirt for men, having a two-ply collar formation provided with a portion at the rear thereof adapted to be positioned adjacent to the nape of the neck of the garment wearer and from the inner ply of which portion dependently extends a special integral garment insert member I. Embodiment No. 2 shows a similar arrangement in which the special integral garment insert member I¹ likewise dependently extends from the inner ply of the said two-ply collar portion. In embodiment No. 3, the said special integral garment insert member I² dependently extends from the outer ply of the said two-ply collar portion and in embodiment No. 4 the special integral garment insert members I³ and 30 dependently extend from both the inner and outer plies of said collar portion.

It is also to be understood that the references made herein to the joining of parts by seams or stitches, is not to be construed as limited to such means for joining the respective items, since the latter may, if desired, be otherwise joined by any prior art means of the type utilized for this purpose in the garment manufacturing practice.

Furthermore, it is to be understood that my invention includes single-ply collar structures, as would be provided, for example, if only the integrally combined fashioned finished edge collar-forming fabric piece 2 and insert member I of FIG. 1 disclosed in my said Patent Number 3,107,357 were utilized to provide the garment insert unit.

Of course, it will be understood by those skilled in this art that the improvements specifically shown and described, can be changed and modified in various ways without departing from the invention herein disclosed, the scope of which is more particularly indicated and defined by the hereto appended claims.

I claim:

1. A garment of the character described comprising; a fabric structure forming a front body portion of the garment; a fabric structure forming a rear body portion of the garment which rear fabric structure extends across the full width of the garment and is connected with said front fabric structure of the garment; said front fabric structure being provided at its upper end with vertically extending attaching edges for a placket forming portion; a fabric unit having a collar formation at its upper end that is integrally formed with said fabric structure forming said rear body portion of the garment which extends across the full width of the garment and said fabric unit having along the front thereof an integral placket forming portion provided with vertical attaching edges in correspondence with the vertical attaching edges at the upper end of said fabric structure forming the front body portion of the garment; and means connecting said attaching edges.

2. A garment of the character described comprising; a fabric structure forming a front body portion of the garment; a fabric structure forming a rear body portion of the garment which rear fabric structure extends across the full width of the gament and is connected with said front fabric structure of the garment; said front fabric structure being provided at its upper end with vertically extending attaching edges for a placket forming portion; a fabric unit having at its upper end an upstanding collar that includes two material sections forming inner and outer components of said collar, the outer component of said unit having along the front thereof a vertically extending integral placket forming portion provided with vertical attaching edges in correspondence with the vertically extending attaching edges at the upper end of said front fabric structure, and said outer collar component being integrally formed with said rear fabric structure which extends across the full width of the garment; and means connecting said attaching edges.

References Cited by the Examiner
UNITED STATES PATENTS

| | | | |
|---|---|---|---|
| 360,094 | 3/1887 | Holmes | 2—90 X |
| 527,551 | 10/1894 | Groat | 2—90 |
| 593,954 | 11/1897 | Way | 2—92 X |
| 905,270 | 12/1908 | Abraham | 2—118 X |
| 2,058,801 | 10/1936 | Kamil | 2—90 |
| 2,563,687 | 8/1951 | Metzger | 2—116 X |
| 2,642,570 | 6/1953 | Heilbronner | 2—90 |
| 2,782,619 | 2/1957 | Bialostok | 2—90 X |

JORDAN FRANKLIN, *Primary Examiner.*